United States Patent [19]

Sammon, Jr. et al.

[11] Patent Number: 6,012,051
[45] Date of Patent: *Jan. 4, 2000

[54] CONSUMER PROFILING SYSTEM WITH ANALYTIC DECISION PROCESSOR

[75] Inventors: Thomas M. Sammon, Jr.; Bradley W. Scurlock, both of San Diego, Calif.

[73] Assignee: America Online, Inc., Dulles, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/794,387

[22] Filed: Feb. 6, 1997

[51] Int. Cl.⁷ .............................. G06F 15/18; G06F 17/60
[52] U.S. Cl. .................................. 706/52; 705/10; 705/26
[58] Field of Search .......................... 395/54, 51; 706/52; 705/26, 27, 10

[56] References Cited

U.S. PATENT DOCUMENTS

| T998,008 | 9/1980 | De Lano, Jr. ................................. 705/7 |
| 4,733,354 | 3/1988 | Potter et al. ............................. 600/300 |
| 4,775,935 | 10/1988 | Yourick .................................... 345/357 |
| 4,794,389 | 12/1988 | Luck et al. ............................... 345/192 |
| 4,829,426 | 5/1989 | Burt ........................................... 706/45 |
| 5,041,972 | 8/1991 | Frost ........................................ 705/10 |
| 5,063,522 | 11/1991 | Winters .................................... 706/10 |
| 5,124,911 | 6/1992 | Sack ........................................ 705/10 |
| 5,167,011 | 11/1992 | Priest ....................................... 706/62 |

(List continued on next page.)

OTHER PUBLICATIONS

U. Shardanand and P. Maes, Social Informatioin Filtering: Algorithms for Automating "Word of Mouth", Conf. Proc. on Human Factors in Computing Systems, pp. 210–217, Dec. 1995.

L. Halliday, "Agents, Inc. wants to help you choose everything," P.C. Letter, vol. 12, No. 6, p. 1, Mar. 1996.

J. Moad, "Web shakeout," PC Week, vol. 13, No. 28, p.E1(2), Jul. 1996.

J.D. Tygar, "Atomicity in Electronic Commerce," Proc. Fifteenth Annual ACM symposium on Principles of distributed computing, pp. 8–26, Dec. 1996.

S. Hedberg, "Agents for sale: first wave of intelligent agents go commercial," IEEE Expert, vol. 11, No. 6, pp. 16–19, Dec. 1996.

F.–C. Cheong, Internet Agents: Spiders, Wanderers, Brokers, and Bots, New Riders Publishing, pp. 61–78, Dec. 1996.

Brule, James F., *Fuzzy System—A Tutorial,*(1985).

Elkan, Charles, "The Paradoxical Success of Fuzzy Logic", *IEEE Expert,* Aug. 1994.

Wan et al, "Document Management Through Hypertext: A Logic Modeling Approach", IEEE Annual Hawaii International Conference on System Sciences, 1994.

*Primary Examiner*—Robert W. Downs
*Attorney, Agent, or Firm*—Fish & Richardson P.C.

[57] ABSTRACT

A system which processes information to identify product choices within a product domain for a user, presents structured data concerning attributes of products in the product domain to the user in a readily understandable and efficient manner, allowing the user to make the best choice according to his or her own personal profile. A user interface presents a sequence of input prompts to the user to gather preference and requirement data for a plurality of attributes of products in the product domain. A decision engine is coupled to the user interface and filters the product domain to present a set of products according to the gathered preference and requirement data as product choices to the user. The preference data comprises a variable associated with particular attributes specified by the user to have a degree of relevance to a product choice in the product domain but not an absolute requirement. The requirement data comprises a variable associated with a particular attribute specified by the user to be required or not required for a product choice in the product domain.

49 Claims, 8 Drawing Sheets

U.S. PATENT DOCUMENTS

| | | | |
|---|---|---|---|
| 5,182,793 | 1/1993 | Alexander et al. | 706/13 |
| 5,239,617 | 8/1993 | Gardner et al. | 706/11 |
| 5,241,624 | 8/1993 | Torres | 345/429 |
| 5,347,614 | 9/1994 | Yamada et al. | 706/59 |
| 5,448,727 | 9/1995 | Annevelink | 707/101 |
| 5,483,637 | 1/1996 | Winokur et al. | 714/26 |
| 5,506,984 | 4/1996 | Miller | 707/10 |
| 5,583,763 | 12/1996 | Atcheson et al. | 707/3 |
| 5,615,342 | 3/1997 | Johnson | 705/27 |
| 5,664,111 | 9/1997 | Nahan et al. | 705/27 |
| 5,687,290 | 11/1997 | Lewis | 706/45 |
| 5,706,442 | 1/1998 | Anderson et al. | 705/27 |
| 5,712,960 | 1/1998 | Chiopris et al. | 706/61 |
| 5,724,508 | 3/1998 | Harple, Jr. et al. | 709/205 |
| 5,724,521 | 3/1998 | Dedrick | 705/26 |
| 5,732,398 | 3/1998 | Tagawa | 705/5 |
| 5,745,882 | 4/1998 | Bixler et al. | 705/26 |
| 5,758,328 | 3/1998 | Giovannoli | 705/27 |
| 5,761,649 | 6/1998 | Hill | 705/27 |

☑ 2-Door Convertible
☐ 2-Door, 4-Wheel Drive Convertible
FIG. 5
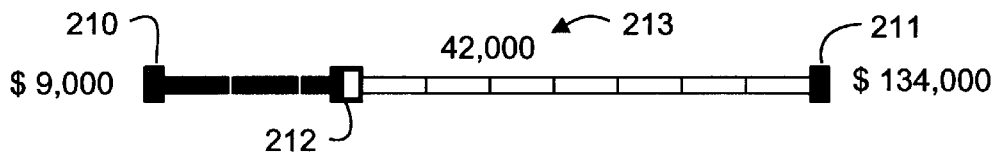
FIG. 6
Have you filed bankruptcy in the last 7 years?   Yes ◯   No ⦿
FIG. 7
Is the vehicle kept in a garage at home? 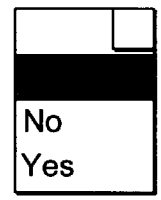
FIG. 8
| Features | Don't Want | Dislike | Don't Care | Like | Must Have |
|---|---|---|---|---|---|
| Air Conditioning | ◯ | ◯ | ⦿ | ◯ | ◯ |
| AM/FM with Cassette | ◯ | ◯ | ⦿ | ◯ | ◯ |
FIG. 9

CONSUMER PROFILING SYSTEM WITH ANALYTIC DECISION PROCESSOR

BACKGROUND OF THE INVENTION

1. Field of the Invention

The present invention relates systems which assist users in making decisions based upon a user profile; and more particularly to systems which assist users in making complicated choices among a set of products in a product domain, such as purchasing a car, based upon user specified requirements and preferences for the product choice.

2. Description of Related Art

Currently, considerable effort is being expended in the development of applications of computers in the marketing and distribution of consumer products. For example, U.S. Pat. No. 4,775,935 to Yourick; U.S. Pat. No. 5,041,972 to Frost; and U.S. Pat. No. 5,124,911 to Sack describe systems which process information about products that consumers choose in order to determine attributes of such products which are important in consumer decisions. These systems help producers to design products more likely to sell, and help marketers to understand which products to sell to what consumers. However, these products are not focused on assisting a consumer make a complicated product choice.

There is also a significant development in the field of decision-making systems. For example, U.S. Defensive Publication T998,008 by DeLano Jr.; U.S. Pat. No. 4,829,426 to Burt; and U.S. Pat. No. 5,182,793 to Alexander et al. describe computer software based systems which provide tools in assisting a decision-making process. However, these systems do not provide a readily usable technique by which a profile of a user can be applied to the decision-making process in making intelligent choices.

Thus, although significant technology exists for applying computer systems to making decisions, there is a need for the application of such technology to resolving complex choices, such as consumer product choices which are based on unique profiles of the person making the choice, and to provide the results efficiently to the person. This need is particularly apparent in the field of consumer buying decisions tied to "big ticket" purchases that are traditionally provided through untrustworthy or biased sales channels. These big ticket purchases typically require the significant degree of analysis and logic, because of the large number of choices and the many variables that need to be considered in making the choice.

SUMMARY OF THE INVENTION

The present invention provides a system which processes information to identify product choices within a product domain for a user, and that presents structured data concerning attributes of products in the product domain to the user in a readily understandable and efficient manner, allowing the user to make the best choice according to his or her own personal profile. Thus, the invention includes a user interface which presents a sequence of input prompts to the user to gather preference and requirement data for a plurality of attributes of products in the product domain. A decision engine is coupled to the user interface that filters the product domain to present a set of products according to the gathered preference and requirement data as product choices to the user. The preference data comprises a variable associated with particular attributes specified by the user to have a degree of relevance to a product choice in the product domain, but not an absolute requirement. The requirement data comprises a variable associated with a particular attribute specified by the user to be required or not required for a product choice in the product domain. According to the present invention, the user is guided through the sequence of input prompts in order to assist the user in creating a personal profile of preferences and requirements for products in a particular product domain. The decision engine applies the requirements and the preferences to generate a list of one or more products which meet the requirements specified by the user profile, ranked according to the preferences specified by the user profile to assist the user in making a product choice.

The user interface according to one aspect of the invention includes a navigation window, which indicates a position to the user in the sequence of input prompts, in order to allow the user feedback concerning a current position in sequence. Also, the navigation window is utilized in one alternative, to indicate to the user the amount by which the product domain is narrowed in response to earlier prompts in the sequence, as additional feedback in the product decision-making process.

The decision engine according to one aspect of the invention stores the plurality of attributes in a hierarchical array. Resources in the decision engine assign weights to corresponding attributes in the plurality of attributes in response to the gathered preference data, and to position in the hierarchical array of the corresponding attributes. A set of attribute measurements is generated based on the gathered data. The measurements are used to compute a product score for each product in the product domain, which satisfies the requirement data.

According to yet another aspect to the invention, the attribute measurements for attributes in the plurality of attributes have respective measurement types which are selected from a set of measurement types including (1) a numeric type for a numeric valuation of an attribute, (2) a boolean type for an attribute which can be characterized by a true or false indicator, (3) an enumerated type for an attribute selected from a set or a list, (4) an option type for an attribute that is included as a standard feature, included as an optional feature, or not included, and (5) a ranged numeric type for attributes specified by a range of numeric values. According to this aspect the invention, resources in the decision engine compute product scores in response to normalization routines selected according to the measurement types of the corresponding attributes.

The decision engine also includes resources which assign rules to attributes specifying a response to missing input data for the attribute, and applying the rule for the identified attribute when the input data is missing, in the process of producing the attribute measurement and the product score. Also, the decision engine includes resources that assign rules to attributes in response to irrelevant input data for the attributes, and to apply such rules as appropriate in the generation of the attribute measurement and product score. Data may be missing, for example, because of an input error or because a user skipped a particular prompt in the input process. The data is irrelevant for a particular attribute and a particular product, for example, if the attribute does not apply to the product.

According to yet another aspect of the invention, the sequence of the input prompts includes at least one input prompt that comprises a graphical tool which presents a range of choices represented by a graphic, such as slider bar, displayed on the display, and a selector element, such as a caret on the slider bar, and positioned by a user with an input device to indicate a choice in the range. Resources coupled with the decision engine compute a numeric value in response to the user's choice. Also, such resources in one embodiment compute a numerical value based on a fuzzy logic function, to take advantage of the non-linear characteristic of certain attributes of products in the product domain.

According to an alternative, the present invention can be characterized as a method for generating a list of items from a product domain according to user's preferences and requirements for a set of attributes A(n), organized in a sequence for the index (n) equal to 1 to N, of attributes in the product domain. The method includes steps (not necessarily in this order) of:

(1) defining a set of available choices for an attribute A(n), where the set of available choices for attribute A(n) includes the available choices for all items in the product domain for the first attribute (n=1), and includes the available choices for items in a set of remaining items when n is greater than 1;

(2) prompting a user to input data indicating a preference or a requirement for attribute A(n) in the set of attributes, according to the set of available choices for the attribute A(n);

(3) storing the input data for the attribute A(n) to develop a user profile;

(4) determining the set of remaining items satisfying requirements for a subset of attributes A(i), for i equal to (n, n−1, . . . 1) such that the set of remaining items corresponds to items in the product domain which satisfy requirements for previous attributes in the set;

(5) providing an indicator of a position in the sequence, and a count of the items in the set of remaining items, to the user;

(6) repeating the steps of defining, prompting, storing, determining and providing for attributes A(n), for n equal to 1 to N, in the set of attributes; and (7) assigning scores to items in the set of remaining items according to the input data indicating preferences for attributes in the set of attributes, and ordering the items in the set of remaining items according to the scores.

Thus, according to this method the user is presented with a sequence of prompts, and provides preference or requirement data in response to prompts in the sequence. As each prompt is completed, the set of remaining items is computed based on any requirements specified, the user is notified of the current position in sequence of prompts, and the count of the set of the remaining items is presented to the user. Thus, the user is able to navigate through a sequence of prompts, identify preferences and requirements for specific attributes, and progressively narrow the choices of items in the product domain until a manageable set is provided. The user is then able to make an intelligent product choice based on a manageable set of items which meets the personal profile of the user for the product to be purchased.

Accordingly, the present invention provides a decision engine and process designed and optimized to use a consumer's personal profile in deciding among a large number of multi-faceted items within a domain (e.g., cars, mutual funds, news sources, colleges, etc.). The invention guides the consumer through a process by which the consumer expresses both high level abstract statements of interest, and low level explicit choice statements to create a personal profile. The profile is represented as a hierarchical collection of requirements and preferences, where a requirement is a hard constraint that must be satisfied in order for an item to remain in the set being considered, and a preference as a degree of interest, such as indication of the relative likes and dislikes of the consumer for a particular attribute. The personal profile is then applied to a product domain using intelligent normalization routines, to produce a ranked list of items which satisfy the requirements ordered by the preferences expressed by the user. Thus, an analytic decision processing tool is provided that uses a low level representation of a consumer's profile based on requirements and preferences, and an abstract hierarchical and statistical representation of the domain of interest, to determine a personally ranked list of items for the consumer. The system is easy to use, and substantially increases the efficiency of the marketing channel involved in the product domain.

Other aspects and advantages to the present invention can be seen upon review of the figures, the detailed description and the claims which follow.

BRIEF DESCRIPTION OF THE FIGURES

FIG. 5 illustrates a check box prompt widget for use in the graphic user interface of the present invention.

FIG. 6 illustrates a numeric slider prompt widget for use in the graphic user interface of the present invention.

FIG. 7 illustrates radio buttons prompt widget for use in the graphic user interface of the present invention.

FIG. 8 illustrates a combo box prompt widget for use in the graphic user interface of the present invention.

FIG. 9 illustrates a full-notched slider prompt widget for use in the graphic user interface of the present invention.

DETAILED DESCRIPTION

Figure 1:
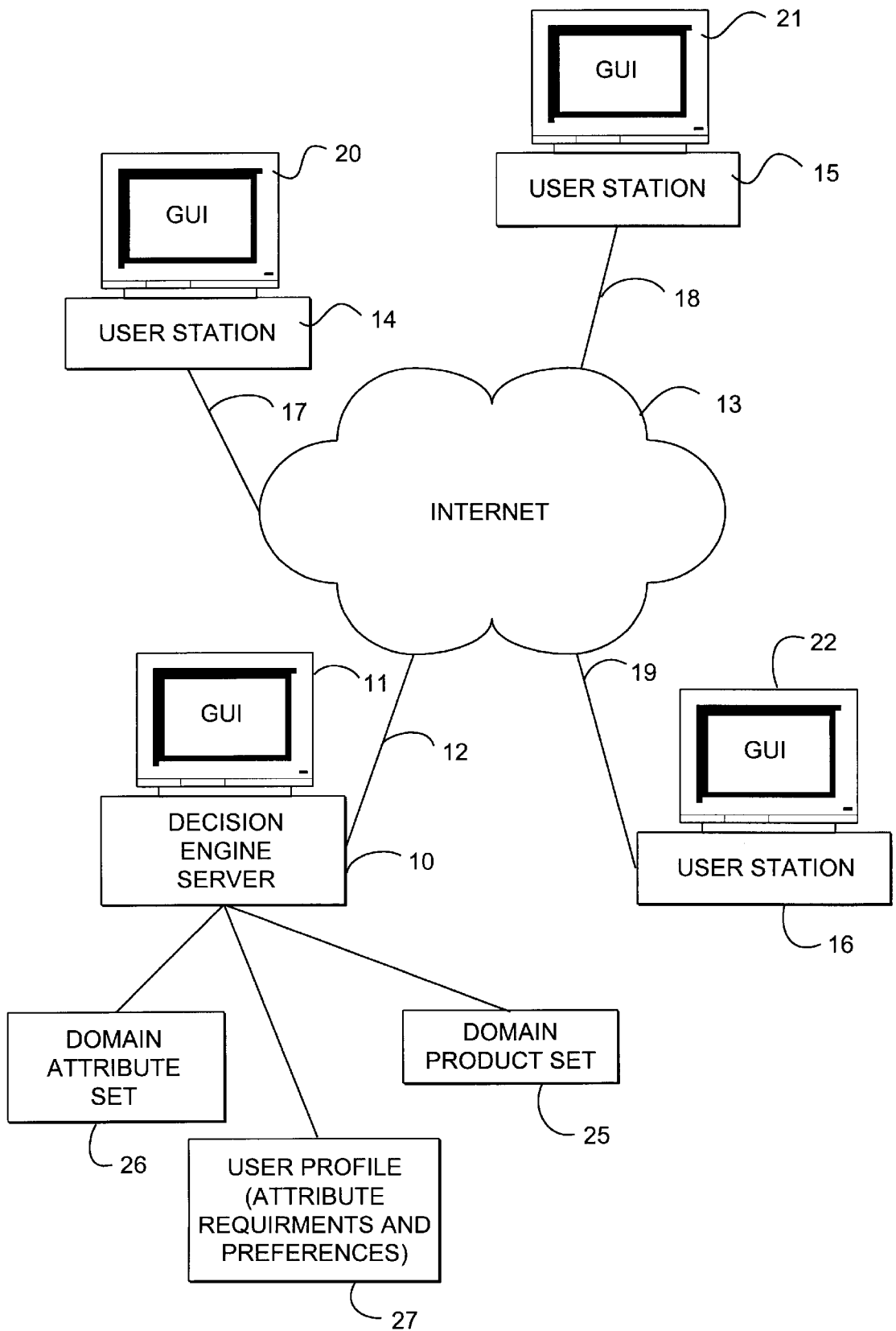
FIG. 1 is a simplified view of the present invention in the context of an Internet based decision engine server.

A detailed description of the present invention is provided with respect to FIGS. 1 through 15, in which FIG. 1 illustrates the present invention in the context of an Internet server. Thus, the system includes a decision engine server 10, such as a computer workstation having decision engine software loaded therein, according to the functions described below. The decision engine server 10 includes a display 11 on which a graphic user interface is displayed for the purposes of gathering user profile data from a person local to the decision engine server 10. The decision engine server 10 is also coupled by connection 12 to a wide area network, such as the Internet 13. User stations 14, 15, 16 are coupled to the Internet 13 by respective connections 17, 18, 19. Each user station 14, 15, 16 includes a display 20, 21, 22 on which a graphic user interface is presented to gather user profile data under control of the decision server 10. Thus, a user at user station 15 is capable of accessing a decision server 10 using standard Internet protocols. The decision engine server drives a graphic user interface on the display 21 of station 15 in order to collect user profile data, and present user profile data to the decision server.

According to the present invention, the decision engine server 10 includes data structures which define a domain product set 25, which consists of a list of items in a product domain, such as cars available on the market, along with specific product information concerning attributes available with each item in the set. An additional data structure is included with the server 10 that defines an attribute set 26 for the product domain. The domain attribute set 26 in a preferred system consists of a hierarchical array of attributes specified for the entire product domain 25.

The user profile information is gathered from the user station and stored in a user profile data structure 27, that characterizes the requirements and preferences according to the input data provided by the user. The decision engine server 10 processes the user profile 27 according to the domain attributes set 26 and a domain product set 25 to produce a ranked list of remaining items in the set for presentation to the user.

The environment of FIG. 1 illustrates the use of the decision engine in an Internet setting. Of course, the decision engine is also applicable to local installations, such as intranets, or single workstation embodiments.

Figure 2:
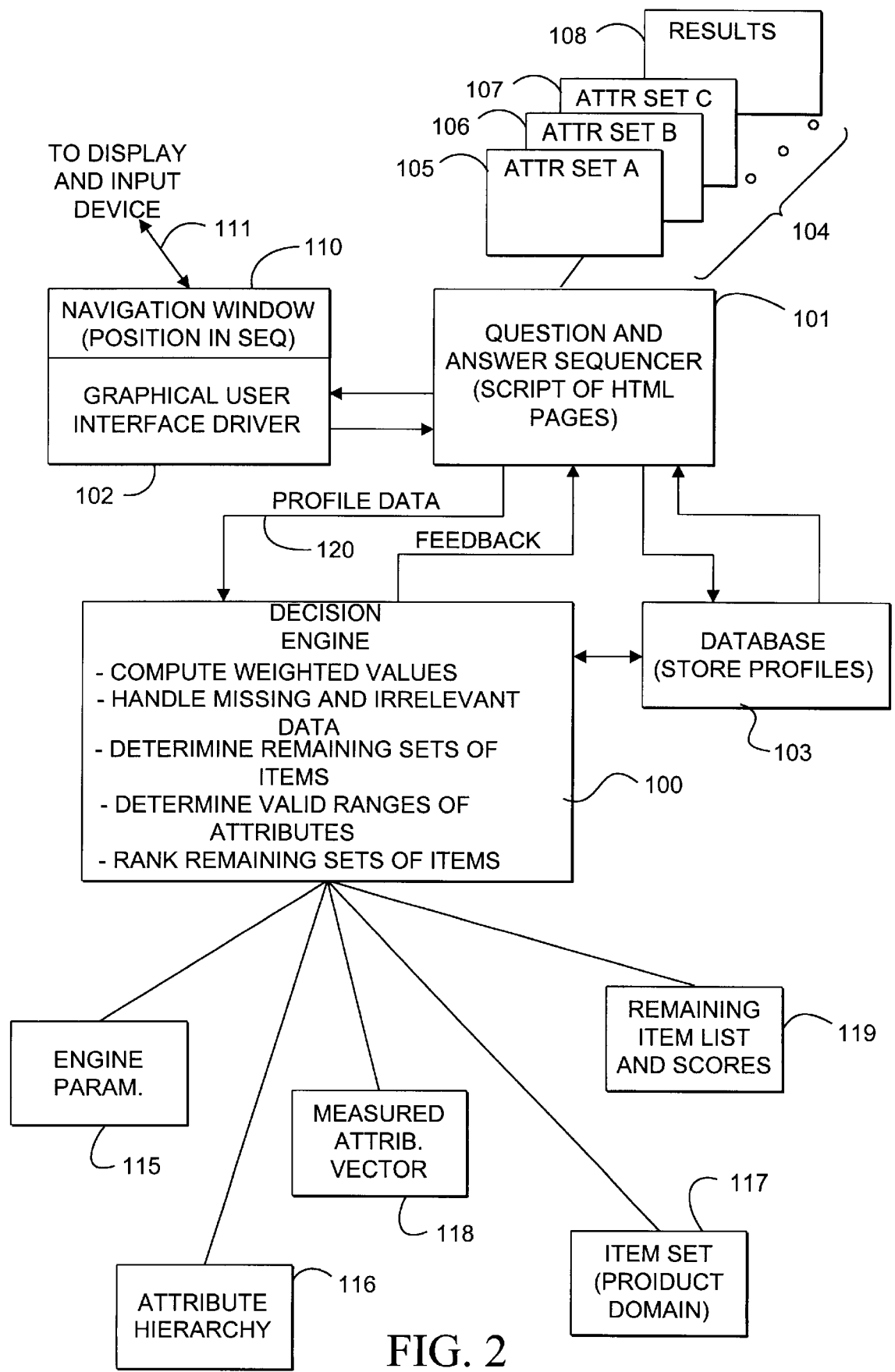
FIG. 2 is a functional blocked diagram of the system of the present invention.

FIG. 2 provides a functional block diagram of the decision engine and consumer profiling process according to the present invention. The system includes a decision engine module 100, a question and answer sequence module 101, a graphical user interface driver 102, and a database module 103. The decision engine module 100 comprises an analytical decision processing module that uses a low level representation of a consumer's profile and an abstract hierarchical and statistical representation of the domain of interest to determine a personally ranked list of items for the consumer. The question and answer sequencer 101 uses an editorially scripted narrative to dynamically and personally guide the consumer through the creation of a personal profile. The database module 103 is a relational database or other storage system used for the storage and maintenance of consumer profiles. The graphic user interface driver 102 contains simple graphic priitives and other tools which allow the user to make choices and express opinions in response to the prompting by the question and answer sequencer 101.

The question and answer sequencer 101 in a preferred embodiment includes a script of HTML (Hypertext Markup Language) pages which specifies an order of a set of pages 104, including a first page 105 for a first set of attributes, set A, a second page 106 for attribute set B, a third page 107 for attribute set C and so on throughout the entire attribute hierarchy. Also, a page 108 is included for presenting the results to the user. The question and answer sequencer 101 provides the HTML pages according to the script to the graphic user interface driver 102 which supplies the images to prompt the user to provide input data. In addition, the question and answer sequencer 101 keeps track of the current position of the process in the script. Thus, the graphic user interface driver includes a navigation window 110, which indicates to the user a position in the sequence of prompts. The graphic user interface driver 102 is coupled on line 111 to a display and an input device in order to gather the input preference and requirement data. As discussed above, with respect to FIG. 1, the line 111 may include a channel through the Internet or other network link to a remote user, or a direct connection to a local display as suits the needs of a particular implementation.

The decision engine 100 includes a set of data structures, including an engine parameter structure 115, an attribute hierarchy 116, an item set 117, a measured attribute vector 118, and a remaining list of items and scores 119 (for example, expressed by fields in the item set structure 117). Utilizing the data structures 115 through 119 and profile data provided on line 120 from the question and answer sequencer 101, the decision engine computes weighted values for attributes in the set, handles missing and irrelevant data for attributes in the set, determines remaining sets of items based on requirements expressed by the user earlier in the question and answer sequence, determines valid ranges of attributes based on the remaining sets, and ranks the remaining sets of items based on the preference values.

The engine parameter structure 115 includes information such as normalization routines for specific measurement types, and other global parameters for the decision engine for a particular product domain. The attribute hierarchy 116 consists of a set of nodes arranged in a hierarchy for attributes to be characterized in a user profile. The item set 117 consists of a list of all items in the product domain, along with specifics about the particular attributes supported for each item. The measured attribute vector 118 includes the normalized values of the consumer profile for the attribute hierarchy based on the input information provided by the user. The remaining lists and scores 119 provide a result based on the measured attribute vector as it is applied to the item set. After the prompting process is complete, this data structure 119 is used to provide the user a resulting set of items from the product domain which match the user's preferences and requirements.

Figure 3:
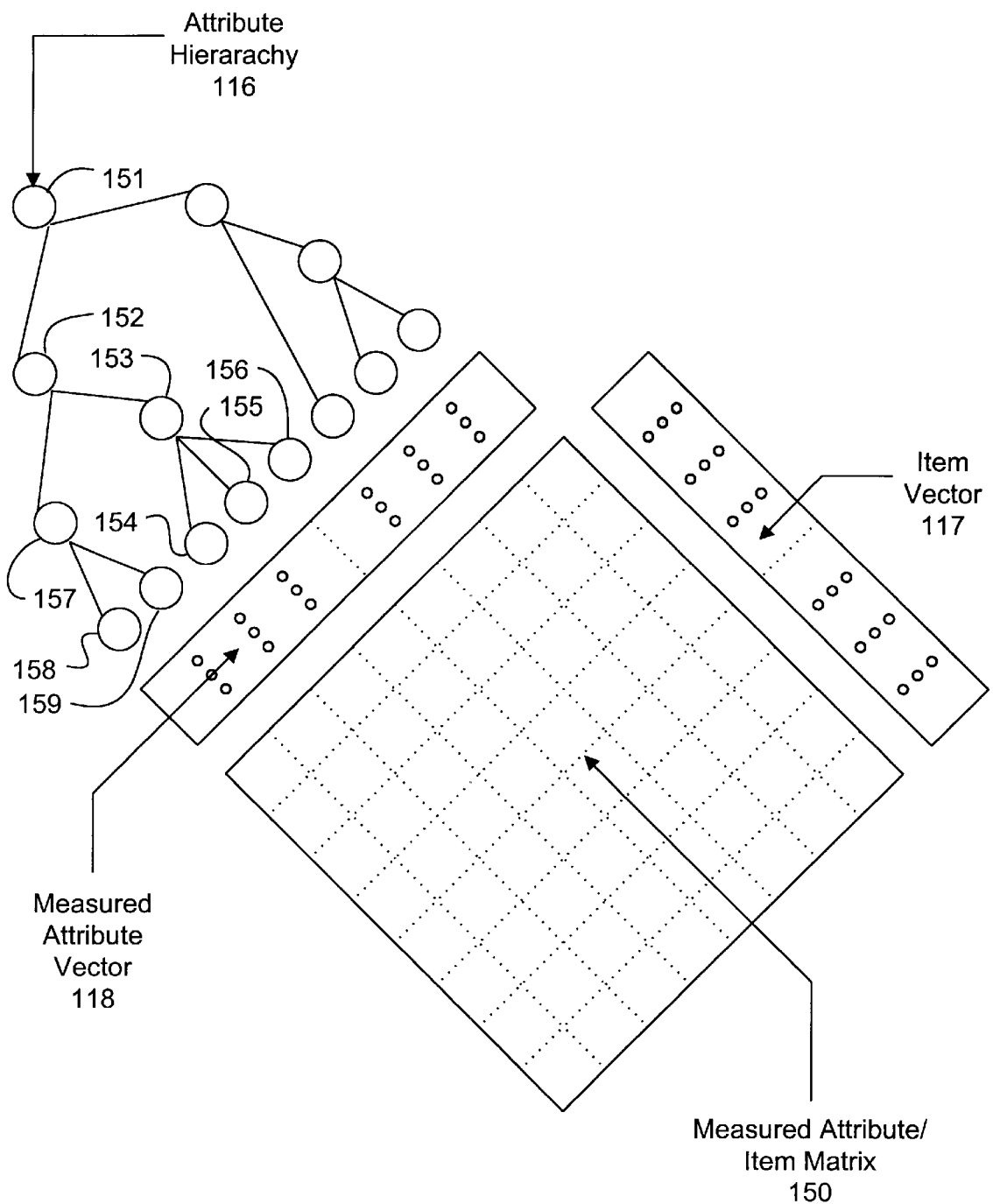
FIG. 3 is an architectural diagram of the decision engine according to the present invention.

FIG. 3 provides an architectural view of the decision engine 100. The decision engine includes attribute hierarchy 116, the item set vector 117, and the measured attribute vector 118. Also, a measured attribute/item matrix 150 is involved in the decision engine processing.

The attribute hierarchy 116 is specified by a data structure of nodes arranged in a hierarchical array. Thus, it provides a hierarchical organization of attributes which are relevant for the domain which may be considered by the consumer. The hierarchical organization, or other abstract organization of attributes, is based on knowledge engineering within the domain and on opinions of experts within the domain. Thus, the organization is hueristically determined and optimized for a particular product domain. In the preferred system the hierarchy is represented as a tree structure including a root 151 representing the overall domain (e.g., automobiles). Internal nodes moving down the tree represent progressively more specific compound attributes. For example, in the car domain one level down from the root 151 is a compound attribute node 152 for size, one level down from the node 152 is a compound attribute node 153 for external size. The leaves 154, 155, and 156 represent specific measurable attributes for the item. In the car example, the leaves 154 to 156 for external size include height, length and width. Another internal node one level down from the car size node 152 is node 157 corresponding to internal room. Leaves off of node 157 include the leaf 158 for headroom and the leaf 159 for leg room.

Although a simplified representation of an attribute hierarchy 116 is shown in FIG. 3, the hierarchy can be quite complex covering large numbers of attributes in complex products.

According to the present invention, the attribute hierarchy also contains apriori weightings for constituents of compound internal attributes. For example, apriori weightings for external size are 33% height, 33% width and 33% length. Both the abstract organization of attributes within the tree and the corresponding apriori weightings are based on knowledge engineering within the domain, opinion of domain experts, and statistical analysis. The attribute hierarchy is an abstract expression of the organization of features to be considered within the domain, and a generic expression of the relative importance of each of the features.

The measured attribute vector 118 is used to record statistical characteristics of each measured attribute for the complete population of items. That is, each cell in the vector 118 represents a complete description of a single attribute across all items. The description includes the parameters, such as the minimum, the maximum, the mean, the median, the standard deviation and a linear approximation of the distribution for the measurable attribute. Furthermore, the cell contains instructions on how the user input should be interpreted at run-time.

The measured attribute vector is associated with the leaf nodes in the attribute hierarchy, and used together with the user's profiling information to produce attribute measurements which are recorded to define a user profile.

There are five types of measured attribute which are supported by the decision engine: (1) numeric (2) boolean (3) enumerated (4) option and (5) ranged numeric. A numeric measured attribute is a floating point valuation of a feature, e.g., in the car domain numeric attributes includes top speed and braking distance. A boolean measured attribute is an attribute which can be characterized as true or false, for example, whether a car is an import. An enumerated measured attribute is a set or list expression of an attribute, such as a list of the colors which are available for a car. A measured attribute vector has each of the enumerated elements from the list within the vector; for example, red, green or blue are each included in the vector. At build time, the enumerated elements are placed adjacent to one another within the vector, the first element is marked as the beginning of the enumerated list, and the last element is noted as the last element of the group. There are two types of enumerates, mutually exclusive enumerates and non-mutually exclusive enumerates. In the mutually exclusive case, only one of the enumerated elements can be true per item. An option measurement type is like a boolean type, except that it has one false state and two true states. A false state implies that the feature is not available. The first true state indicates that the feature is available as standard equipment. The second true state indicates that the feature is available as an add-on option on the item. The ranged numeric attribute is used for numeric attributes which cannot be expressed by a single numeric point, but instead cover a range of numbers.

As a user profile is used to populate the attribute hierarchy, the measured attribute vector 118 is used to compute the measured attribute/item matrix in response to the user profile. The measured attribute/item matrix 150 comprises normalized values for each measured attribute for each item within the domain. Each entry is a normalized floating point number ranging from 0.0 to 1.0 in a preferred example. The methodology used for normalization is dependent upon the measured attribute type as illustrated in Table 1 below. If the measured attribute data is unavailable for a particular item, it is marked as such within the corresponding matrix. There are two types of unavailable data, including missing data and irrelevant data. Missing data is information about an item that should be available but for some reason is currently not available. Irrelevant data is information which does not pertain to a specific item (for example, 4-wheel drive transmission for an item that is only available with 2-wheel drive transmission).

TABLE 1

Normalization Methods of Each Measured Attribute Type

| Measured Attribute Type | Normalization Method ($nv_i$ = normalized value for item i) |
| --- | --- |
| Numeric | $nv_i = (V_i - V_{min})/(V_{max} - V_{min})$ <br> where <br> $V_i$ = measured attribute value for item i <br> $V_{min}$ = minimum measured attribute value for all items <br> $V_{max}$ = maximum measured attribute value for all items |
| Boolean | $nv_i = 0.0$ if measured attribute is false for item i <br> $V_{boolean}$ if measured attribute is true for item i <br> where <br> $0.0 \leq V_{boolean} \leq 1.0$ <br> $V_{boolean}$ = heuristically and statistically determined normalized true value for the domain. |
| Enumerated | $nv_i = 0.0$ if measured attribute is false for item i <br> $V_{enum}$ if measured attribute is true for item i <br> where <br> $0.0 \leq V_{enum} \leq 1.0$ <br> $V_{enum}$ = heuristically and statistically determined normalized true value for the domain. |
| Option | $nv_i = 0.0$ if measured attribute is false for item i <br> $V_{standard}$ if measured attribute is standard for item i <br> $V_{option}$ if measured attribute is standard for optional for item i <br> where <br> $0.0 \leq V_{standard} \leq 1.0$ <br> $V_{standard}$ = heuristically and statistically determined normalized standard value for the domain. |

TABLE 1-continued

Normalization Methods of Each Measured Attribute Type

| Measured Attribute Type | Normalization Method ($nv_i$ = normalized value for item i) |
|---|---|
| | $0.0 \leq V_{option} \leq 1.0$ |
| | $V_{option}$ = heuristically and statistically determined normalized option value for the domain. |
| Ranged Numeric | $nv_i = (((Vupper_i - Vlower_i)2.0) - V_{min})/(V_{max} - V_{min})$ |
| | where |
| | $Vupper_i$ = upper range for measured attribute value for item i |
| | $Vlower_i$ = lower range for measured attribute value for item i |
| | $V_{min}$ = minimum measured attribute value for all items |
| | $V_{max}$ = maximum measured attribute value for all items |

The decision engine handles missing data according to rules specified for each attribute. Thus, for example if data is missing for a particular attribute, the attribute can be valued with a neutral value in the scoring of an item, or it may be ignored. Alternatively, missing data may be characterized as a requirement depending on the particular attribute involved.

The item vector 117 consists simply of a list of the items in the product domain, a specification of whether they are to be included or excluded from the remaining set of items during processing, and a floating point score which is accumulated during the running of the engine. The set of remaining items and scores is thus determined by fields in the item vector 117.

At run-time, the engine uses the attribute hierarchy 116, measured attribute vector 118, and item vector 117 along with the user profile which populates the attribute hierarchy 116 to determine personalized results. The engine has the ability to run in both the item direction where a user's attribute profile determines the ranked list of items, and in an attribute direction where a list of items generates a valid range of attributes for the use during the prompting process.

When running in the item direction, the engine receives both the user's attribute profile and the engine operating instructions, including a propagation method to be used and how to deal with missing data or other anomalies. The first step in the engine run in the item direction, requires using a personalized instance of the attribute hierarchy to create an instance of the measured attribute vector according to the user profile. This involves propagation of the preference values down attribute hierarchy tree and normalization of requirements at the leaves at the attribute hierarchy. Preferences can be stated any where within the hierarchy attribute tree, whereas requirements refer to specific measured attributes and correspondingly are only recorded at the leaves of the attribute hierarchy tree. In this step, preferences stated at non-leaf nodes within the user profile or propagated down to the leaves using a propagation algorithm.

According to a first embodiment, propagation of preference to the leaf nodes of the attribute hierarchy is done using an optimistic algorithm, and according to a second alternative according to damped algorithm. Example optimistic and damped algorithms are specified in Table 2 below.

TABLE 2

Preference Propagation Algorithms

| Propagation Method | Algorithm |
|---|---|
| Optimistic | if $Pinput_i = 0.0$ then |
| | $Pcomputed_i = W_i * Pcomputed_{Parent(i)}$ |
| | else if $Pinput_i \neq 0.0$ |
| | $Pcomputed_i \, W_i * Pinput_i$ |
| | where |
| | $Pinput_i$ = user preferred for attribute node i |
| | $W_i$ = apriori weight for attribute node i |
| | $Parent_i$ = parent node for attribute node i |
| | $Pcomputed_i$ = propagated preference value for attribute node i |
| Dampened | if $Pinput_i = 0.0$ then |
| | $Pcomputed_i = W_i * Pcomputed_{Parent(i)}$ |
| | else if $Pinput_i \neq 0.0$ |
| | $Pcomputed_i = ((W_i * Pcomputed_{parent(i)} + (Pinput/depth_i))*$ |
| | $Pinput_i/abs(Pinput_i))$ |
| | where |
| | $Pinput_i$ = user preferred for attribute node i |
| | $W_i$ = apriori weight for attribute node i |
| | $Parent_i$ = parent node for attribute node i |
| | $Pcomputed_i$ = propagated preference value for attribute node i |
| | $depth_i$ = depth of node within attribute hierarchy tree |
| | abs = absolute value |

The propagation algorithm is specified as part of the operating instructions passed in the engine. The optimistic algorithm allows the user to treat specific detailed attributes as equivalent to larger, broader attribute concepts. The damped algorithm adjusts the preferences according to the respective positions within the attribute hierarchy, preventing any detailed attribute preference from overwhelming, broader, high level attribute preferences.

Also in this step, requirements stated at leaf attributes within the profile are converted to their normalized values. The normalization methodology for each attribute type in one embodiment is the same methodology used to create the measured attribute/item matrix.

Next, the values for fields in an item vector, that indicate include or exclude and a score, are generated using an instance of the measured attribute vector and the measured attribute/vector matrix. Each cell within the item vector represents a single item within the domain. If the item satisfies all requirements, the corresponding item cell is marked "include". Further, for each item which is feasible, the corresponding cell will contain a score ranging from 0.0 to 1.0 in a normalized embodiment. Also, the engine simultaneously checks requirements and computes preference ranking through each item. The engine progressively moves down the measured attribute vector instance, checking each item within the matrix for compliance with local requirements. If the item does not satisfy the requirement, it is marked "exclude", removing it from future computation. If the engine finds that the data element is either missing or irrelevant, the engine uses the data anomaly processing instructions. These data anomaly processing instructions specify the number of missing and/or irrelevant data elements, or types of missing and/or irrelevant data, which can be allowed for a successful computation. As the engine runs, it tracks the types and number of missing and irrelevant data elements encountered for each item. If these numbers exceed numbers specified or if a type is encountered within the anomaly processing instructions, the item is marked as infeasible.

In addition to requirement processing, the engine computes the item ranking based on that user's preferences. If the item is feasible, the marginal contribution for this attribute, that is its normalized measured attribute value, times the computed preference for the attribute in the measured attribute vector is added to the item score in the item vector. Finally, the engine normalizes the item scores and sorts the item vector. Item scores are normalized, for example, such that the best scoring item receives a 1.0 score and all other item scores are divided by this best score, mapping each into a 0 to 1 interval. Further, the set of feasible items within the vector is sorted in decreasing order such that the best scoring item appears in the first cell. Infeasible items (marked "exclude") appear at the end of the vector. Thus, a result is generated and presented to the user showing items that meet the requirements ranked according to the user's preferences.

The decision engine is also run in attribute direction, during the prompting process as described below. In the attribute direction, a list of items is used to generate a valid range of attributes. Here the engine is passed the item vector with item cells of interest marked for inclusion and the list of attributes for consideration. The engine runs down the input item vector determining the valid range for each attribute of interest. These valid ranges are then passed back to the calling function, such as the prompt processes described below.

Figure 4:
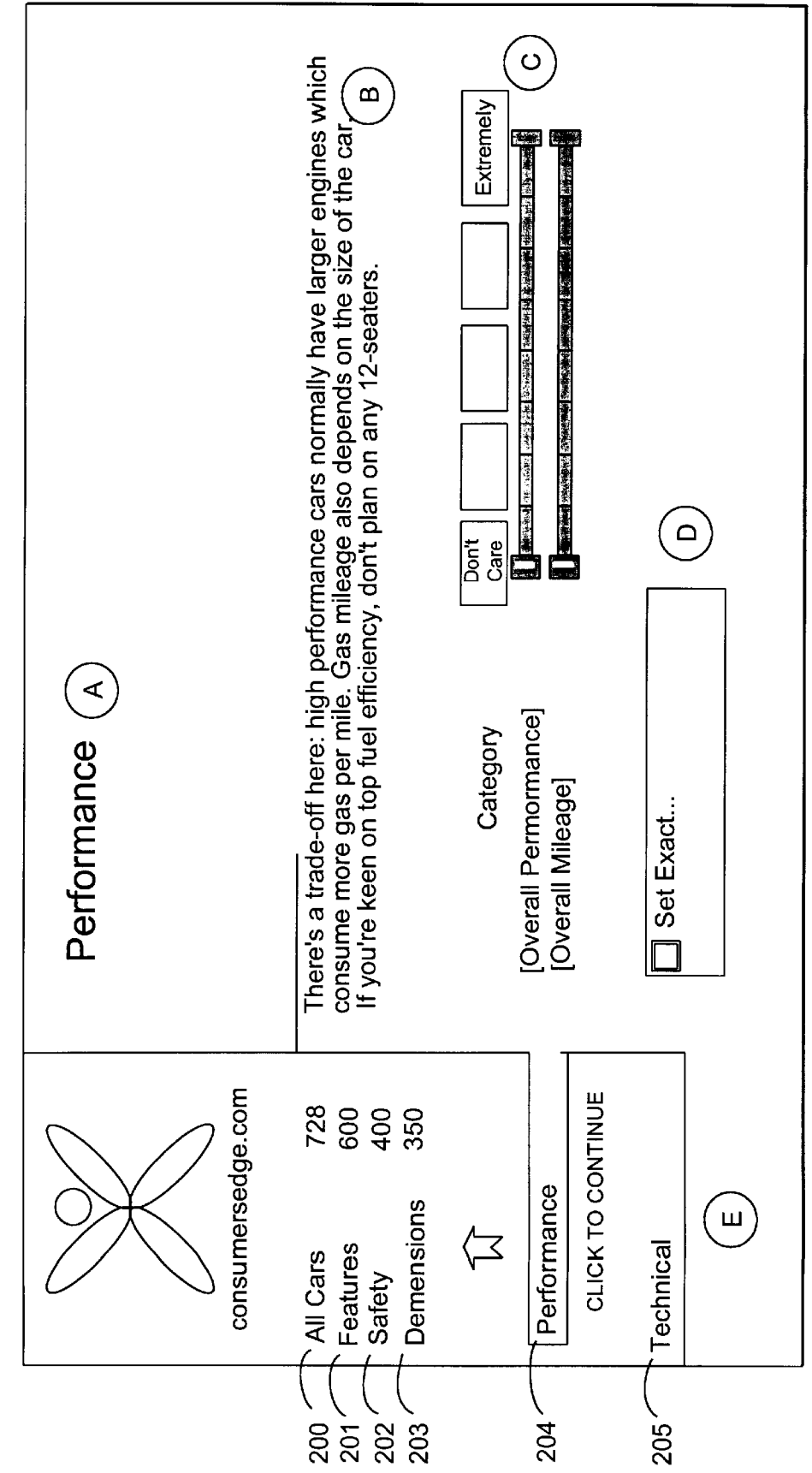
FIG. 4 illustrates a prompt screen used in the graphic user interface in the present invention.

FIGS. 4 to 14 illustrate the implementation of a preferred embodiment of the graphic user interface for presenting a sequence of prompts to gather preference and requirement data to create a personal profile. FIG. 4 illustrates the anatomy of a screen according to a preferred embodiment. The screen includes a title in region A, which is typically a single word indicating the topic of the screen. The screen also includes an explanation field in the region B. The explanation field provides a brief explanation of potential tradeoffs relevant to the current topic. The text typically provides enough detail so that the user does not automatically choose the most favorable settings for all categories.

Also included in the screen is a user input widget in Field C. The widget in Field C is the tool by which the user provides input, and takes a variety of forms as described with reference to FIGS. 5 through 13. In the example shown in FIG. 4, two sliders are illustrated that present the positive preference feature described in FIG. 13. The screen also includes a "specify exact" field in Region D of the screen. This field is a check box available whenever a user can provide specific requirements at a level more detailed than the topic of the current screen. By setting the specify exact button, a user interface, such as the screen shown in FIG. 14, is presented to the user to allow more detailed choices.

The screen of FIG. 4 also includes a navigation window, or bar, in the Region E. The navigation bar in the Region E includes a list of screens, specified by the title in Region A on the screen. Thus, in the example shown the screens used in the prompt sequence are represented by tabs, including a first tab 200 for all cars, a second tab 201 for features of the car, a third tab 202 for safety attributes of the car, a fourth tab 203 for dimensions of the car, a fifth tab 204 for performance of the car, and a sixth tab 205 for technical attributes of the car. Each tab corresponds to a attribute set presented by prompt screen, such as the performance screen of FIG. 4.

Adjacent each tab in the navigation bar E after the user provides input according to preferred aspect of the invention, a count of the number of remaining items in the domain is presented. Thus, for the first tab 200, the number of remaining items is 728 representing all cars in the domain. In this example, in the second tab 201, the user made choices which narrowed the field to about 600. In the third tab 202, the user made choices which narrowed the field to about 400. In the fourth tab 203, the user made choices which narrowed the field to about 350. The user will make choices and specify requirements and preferences in the fifth tab 204 for performance which may narrow the range of choices further. Thus, the system provides constant feedback of the position of the user in a sequence of prompts specified according to a script of pages, as well as progress in narrowing the choices made according to the requirements specified in earlier prompt pages.

FIGS. 5 through 13 illustrate representative widgets which used according to the present invention for specifying requirements and preferences. Thus, FIG. 5 illustrates a check box. The check box is used when the user is capable of choosing one or more options from a list. The box is checked by clicking on the box using a user input tool to select or deselect the item. Typically the check box is used to specify requirements in the attribute set.

FIG. 6 illustrates a numeric slider. A numeric slider includes a bar and a caret which a user is capable of positioning along the bar. On the left end 210 of the bar, a minimum value is displayed. On the right end 211 of the bar, a maximum value is displayed. Depending on the position of the caret 212 along the bar, a value in the region 213 is displayed. The numeric slider is used to allow the user to set a minimum or a maximum value for a attribute. In this example, the user is specifying a maximum price. In alternative embodiments, two carets are used on the same slider bar so that the user can set both a minimum and a maximum value. The values by which the slider increments in response to motion of the caret are set by the designer according to a specific implementation. In addition, in characteristics of the caret 212 can be set so that it slides uniformly across the bar or snaps to specific locations in the bar which correspond to actual choices available for an enumerated attribute.

FIG. 7 illustrates radio buttons. Radio buttons are used to specify attribute choices which are mutually exclusive. The radio button is set by a user clicking on the button using a pointer tool.

FIG. 8 illustrates a combo box widget. The combo box widget is like a pull-down window which allows the user to click on the down arrow in the rectangular box to view a list of options. Typically, a null string is available to the user so that the user can decline to answer.

Figure 10:
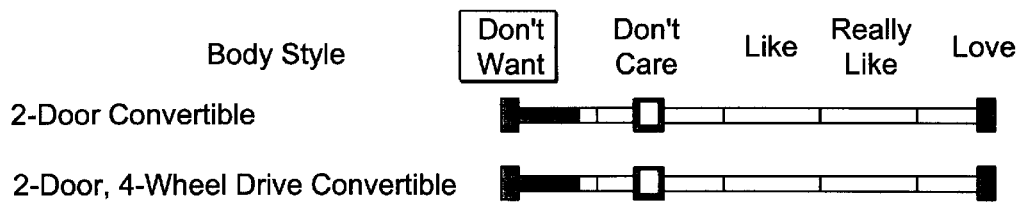
FIG. 10 illustrates a "don't want" half-notched slider prompt widget for use in the graphic user interface of the present invention.
Figure 11:
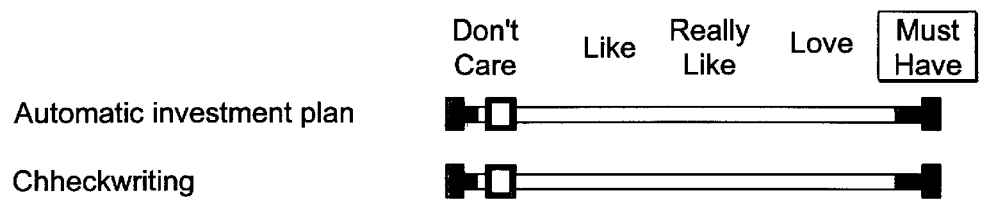
FIG. 11 illustrates a "must have" half-notched slider prompt widget for use in the graphic user interface of the present invention.

The widgets illustrated in FIGS. 9 through 11 allow the user to express both requirements and preferences. Thus, requirements can be prompted on both ends of a widget, on the left only, or the on the right end only.

FIG. 9 illustrates a full-notched slider widget. According to this widget, by choosing the far left button an item that contains the feature will be dropped from the list. By choosing the far right button, an item must contain the feature to remain on the list. The "don't care" button in the center leaves a neutral setting for the future. The dislike setting sets a negative preference value for the future. This setting does not cause an item to be dropped from the list. Rather the information is used to lower the item's ranking on the list. The "like" setting sets a positive preference for the feature and increases the item's ranking on the list. Buttons on FIG. 9 are preferred on pages where the list of features are quite long, and graphical sliders may consume too much memory in the system displaying them. In one system, fuzzy logic maybe used to process preference values assigned in this manner, using techniques, such as those described in the following references: 1) Brule, *Fuzzy System—A Tutorial*, (1985); and 2) Elkan, "The Paradoxical Success of Fuzzy Logic", *IEEE Expert*, August 1994.

FIG. 10 illustrates a "don't want" half-notched slider. This type of slider works with mutually exclusive enumerates, that is attributes that cannot share their existence with other attributes. For example, you can't have a car that is both a coupe and a sedan. Thus, the tool offers an elegant way of letting the user drop items from the list or letting the user set preferences on those items that are acceptable. Thus, in the widget of FIG. 10, a requirement is set on the left end of the slider, while preferences are set as the caret is moved to the right.

A "must have" notched slider is illustrated in FIG. 11. This slider works with features that can share their existence with other features. For example, a mutual fund can have both an automatic investment plan and check writing. However, it does not make sense to actively reject these types of items. Thus, this combo slider does not have a don't want option, but rather provides on the right end a must have option which transforms the corresponding attribute into a requirement.

Figure 12:
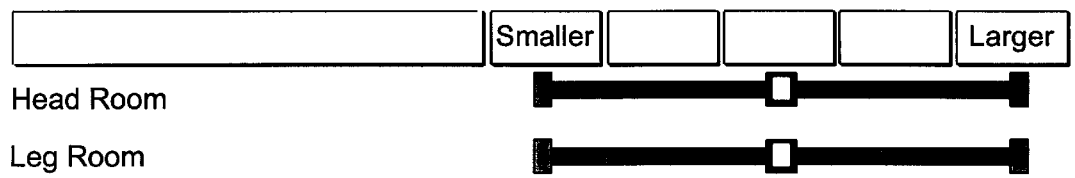
FIG. 12 illustrates a negative/positive preference slider prompt widget for use in the graphic user interface of the present invention.
Figure 13:
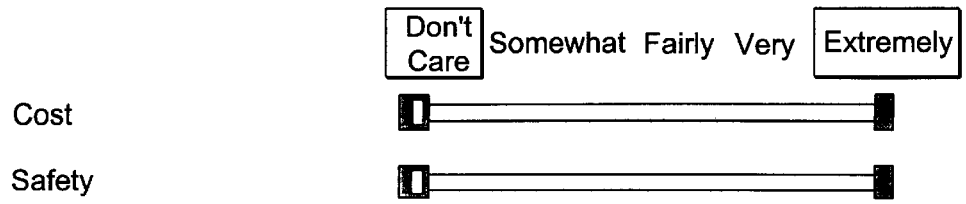
FIG. 13 illustrates a positive preference slider prompt widget for use in the graphic user interface of the present invention.
Figure 14:
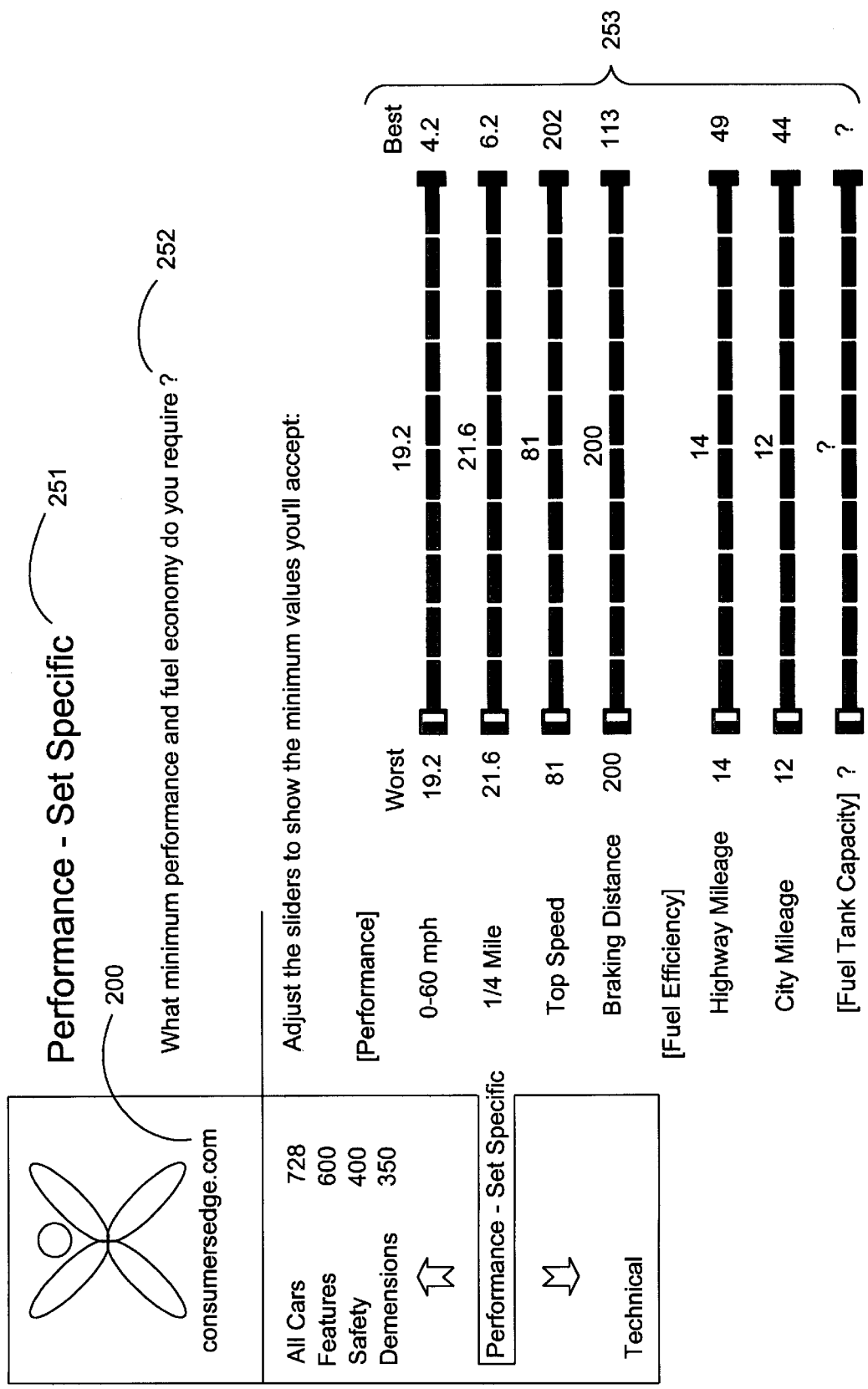
FIG. 14 illustrates a graphic user interface screen by which specific attributes are indicated in response to the set exact button in the window of FIG. 4.

FIGS. 12 and 13 illustrate preference only widgets which allow the user only to effect the ranking of the attribute in lists. No items are ever dropped when a preference only widget is utilized for an attribute. Thus, in FIG. 12 a negative/positive preference slider is illustrated. The neutral setting for this slider is the center of the bar. Sliding the caret to the left, the user indicates a negative preference, where in this example smaller correlates with negative. By moving the slider to the right, a positive preference is expressed.

In FIG. 13 a positive preference slider is illustrated. The neutral setting in this slider is the far left. By sliding the caret to the right, a more positive preference is expressed. A negative preference cannot be set on this bar. Obviously to set a negative preference, the bar can be inverted.

FIG. 14 illustrates the set specific screen which is used in combination with the screen in FIG. 4 in response to the specify exact flag set in the Region D of FIG. 4.

Thus, more specific attributes of the performance category are specified in FIG. 14. The navigation bar in Region E of FIG. 4 is also shown in Region 250 of FIG. 14. This bar is modified only by an indication that the performance set of attributes is being processed by a set specific screen. Otherwise, the navigation bar remains constant, as more specific attributes are processed in the set. Thus, the screen 14 includes a title field 251, an explanation field to 252, and a field of widgets 253 used to specify more detailed preferences and requirements.

In an alternative system, the count of remaining items is updated each time a requirement is expressed in a set specific screen.

Figure 15:
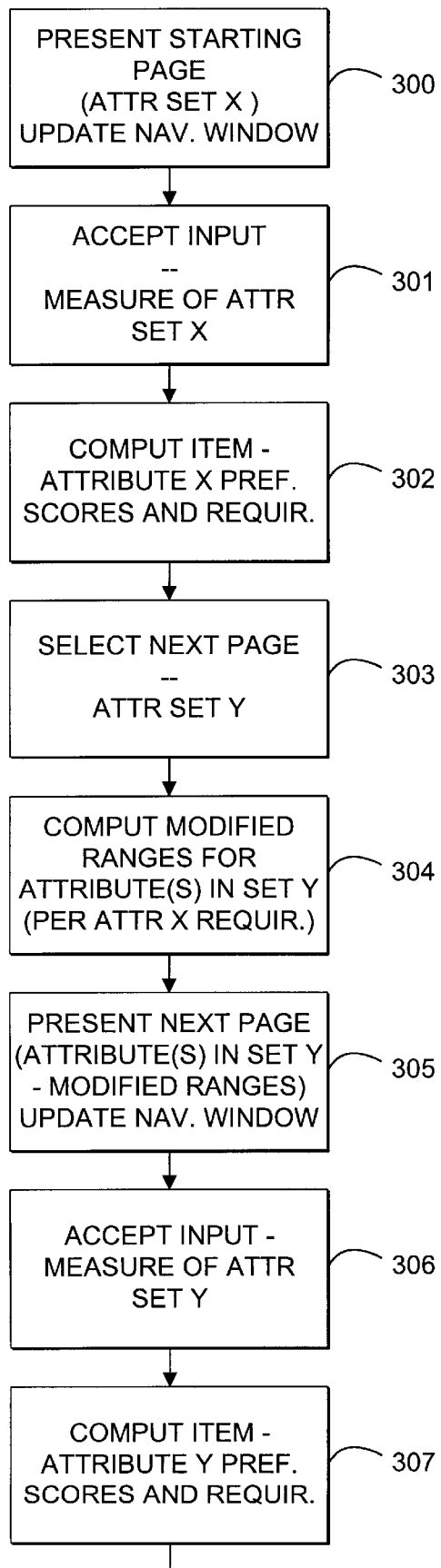
FIG. 15 is a simplified flow chart for the user profile based decision process of the present invention.
Figure 15:
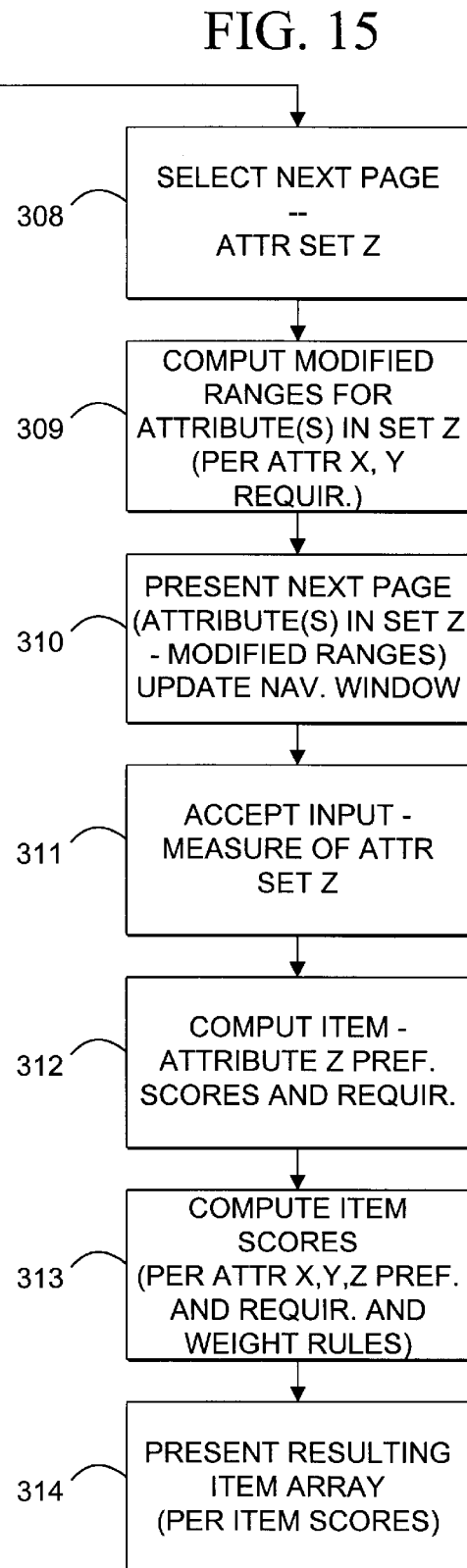

FIG. 15 provides a simplified flowchart of the process of producing a personal profile and providing a list of items from the decision process. The process begins with step 300 in which a starting page is presented to the user prompting for inputs relevant to the attribute set X (a set may include one or more than one member), and providing an updated navigation window. The system then accepts user input indicating a measure of the attributes of set X (Step 301). Item/attribute preference scores and requirements for set X are then computed. (Step 302)

After computing the item/attribute preferences scores and requirements for attribute set X, a next page in the prompt sequence is chosen for attribute set Y. (Step 303). The selection of the next page is done automatically according to a script in a preferred embodiment, or it may be done in response to user input, such as by selection of a specify exact frame, or by other factors determined according to a particular instance of the invention.

After selecting the next page, modified ranges for the attribute or attributes in Set Y are computed by running the decision engine in the attribute direction based on the remaining set of items after requirements specified for attribute set X are taken in account. (Step 304).

Next, the system presents the next page in which the attributes in set Y with modified ranges are presented to the user along with an updated navigation window indicating the number of items left in the set after the requirements for set X are taken into account, and that the page for set Y is currently being displayed. (Step 305).

Next, input is accepted providing a measure for the attributes in Set Y. (Step 306). The item/attribute preference scores and requirements are computed in response to the input. (Step 307). After the scores and requirements are computed for attribute set Y, the next page is selected corresponding to attribute set Z. (Step 308). Modified ranges are computed for the attributes in set Z based on the requirements specified for attribute sets X and Y. (Step 309). The next page is presented with modified ranges for the attributes in set Z and the navigation window is updated. (Step 310). Next, the input is accepted for attribute set Z (Step 311). The item/attribute preference scores and requirements for set Z are then computed. (Step 312). The item scores are computed based on the attribute preference scores and requirements for sets X, Y and Z, and on the weighting rules as discussed above. (Step 313). Finally, the resulting item array, ranked according to item scores is presented to the user. (Step 314).

The processes in FIG. 15 can be generalized for any number of sets of attributes, for example as set out in the Summary of the Invention section above.

Accordingly, the present invention provides personal decision support software for consumers, that helps average people make complicated and daunting consumer product decisions, or other complex decisions. The decision support software of the present invention provides a significant and powerful type of emerging class of software tools known as smart agents. However, the present invention is capable of prompting a user to specify a personal profile for a particular product choice, and applying that personal profile intelligently to provide decision support. There are a number of purchasing areas where consumers are confused by complicated choices, and where the present invention is capable of assisting the decision making process. Buying a new car, investing in a mutual fund, selecting an appropriate college, purchasing real estate, deciding on family travel plans, making health and medical choices, selecting movies and music, and other areas are a few examples for the application of the approach of the present invention.

What is claimed is:

1. A system for processing information to identify product choices within a product domain for a user, comprising:
   a source of a machine-readable specification of the product domain including a plurality of products having attributes within a plurality of attributes;
   an user interface engine, coupled to the source of a machine-readable specification, the interface engine including resources to generate data specifying one or more frames for display on a graphical user interface, and to supply the data to a display to be viewed by a user, the one or more frames including a sequence of input prompts for providing input choices to gather preference and requirement data for attributes in the plurality of attributes of items in the product domain; and
   a decision engine coupled to the user interface engine and to the source of a machine-readable specification, which processes the received input data for the product domain to present a set of items according to the gathered preference and requirement data identified by the input data as product choices to the user,
   wherein the source of a machine-readable specification includes a data structure defining the plurality of attributes as structured elements in an array and resources to assign weights to at least some of the attributes as a function of associated gathered preference and requirement data and as a function of each attribute's associated position in the data structure.

2. The system of claim 1, wherein the one or more frames includes more than one frame with an order, and including:
   a navigation window in the one or more frames which indicates a position in the order.

3. The system of claim 1, including:
   a machine-readable interface script coupled with the user interface engine which specifies the sequence of input prompts for the product domain.

4. The system of claim 1, wherein the preference data comprises a variable associated with a particular attribute in the plurality of attributes specified by user input in response to a prompt in the sequence of prompts to have a degree of relevance to a product choice in the product domain, and wherein the decision engine includes resources responsive to the machine readable specification to produce attribute measurements according to the gathered preference data.

5. The system of claim 1, wherein the requirement data comprises a variable associated with a particular attribute in the plurality of attributes specified by user input in response to a prompt in the sequence of prompts to be required or not required for a product choice in the product domain.

6. The system of claim 1, wherein an input prompt in the sequence of input prompts comprises a graphical slider, including a range of choices represented by a bar displayed on a display, and a slide element displayed with the bar and positioned by a user with a input device on the bar to indicate a choice in the range.

7. The system of claim 1, wherein the array is a hierarchical array.

8. The system of claim 1, wherein the decision engine includes resources to produce attribute measurements according to the gathered preference and requirement data.

9. The system of claim 8, wherein the attribute measurements for attributes in the plurality of attributes have respective measurement types selected from a set of measurement types including
   numeric for a numeric valuation of an attribute,
   boolean for an attribute characterized by a true or false indicator,
   enumerated for an attribute selected from a set,
   option for an attribute that is included as standard feature, included as a optional feature, or not included, and
   ranged numeric for an attribute specified by a range of numeric values; and including
      memory storing an array of items within the product domain; and
      resources to compute item scores in response to normalization routines selected according to the measurement types of the corresponding attributes for respective items in the array of items.

10. The system of claim 8, wherein the machine readable specification includes an array of items within the product domain, wherein the decision engine includes resources to compute item scores for respective items in the array of items in response to the attribute measurements.

11. The system of claim 10, including resources to identify a set of items matching the gathered requirement data, ranked according to the item scores.

12. The system of claim 10, wherein decision engine includes resources to assign rules to attributes in the set of attributes specifying a response to missing input data for the attribute, to identify an attribute in the set of attributes for which the input data is missing, and to apply the rule for the identified attribute in producing the attribute measurement item scores.

13. The system of claim 10, wherein decision engine includes resources to assign rules to attributes in the set of attributes specifying a response to irrelevant input data for the attribute, to identify an attribute in the set of attributes for which the input data is irrelevant, and to apply the rule for the identified attribute in producing the item scores.

14. The system of claim 1, wherein the decision engine includes resources responsive to requirement data specified for a particular attribute in the plurality of attributes which supply to the user interface a range of valid values for a different attribute in the plurality of attributes for items in the product domain satisfying the requirement data for the particular attribute, and wherein the user interface engine includes resources to limit a range of choices presented by a prompt for the different attribute according to the range of valid values.

15. The system of claim 1, wherein an input prompt in the sequence of input prompts comprises a graphical tool, including a range of choices represented by a graphic displayed on a display, and a selector element displayed with the graphic and positioned by a user with a input device on the graphic to indicate a choice in the range.

16. The system of claim 15, including resources to compute a numeric value in response to the choice.

17. The system of claim 16, wherein resources to compute a numeric value include logic to apply a fuzzy logic function to the position of the selector element on the graphic.

18. The system of claim 1, wherein the user interface engine includes resources to provide in the one or more frames, an indicator to the user of a position in the sequence, and a count of the items satisfying requirement data gathered with previous prompts in the sequence for other attributes in the plurality of attributes.

19. The system of claim 1, wherein the user interface engine includes resources to transmit the data specifying one or more frames across a network to a remote display, and resources to receive the input data across the network from a remote input device.

20. The system of claim 19, wherein the data specifying one or more frames comprise one or more HTML documents in machine readable format.

21. The system of claim 1, wherein the preference data comprises a variable associated with a particular attribute in the plurality of attributes specified by user input in response to a prompt in the sequence of prompts to have a degree of relevance to a product choice in the product domain;
wherein the requirement data comprises a variable associated with a particular attribute in the plurality of attributes specified by user input in response to a prompt in the sequence of prompts to be required or not required for a product choice in the product domain; and
wherein the decision engine includes resources responsive to the machine readable specification to produce attribute measurements according to the gathered preference data, to identify the set of items according to the gathered requirement data, to rank the set of items according to the attribute measurements to produce a ranked set of items, and to present the ranked set of items to the user interface engine.

22. A method for generating a list of items from a product domain according to user preferences and requirements for attributes A(n), for n equal to 1 to N, of items in the product domain, comprising:
supplying a specification in a machine-readable form to a processor, the specification defining a set of available choices for attribute A(n), where the set of available choices for attribute A(n) when n equals 1, includes the available choices for all items in the product domain, and includes the available choices for items in the set of remaining items when n is greater than 1;
generating in response to the specification a prompt display prompting a user to input data indicating a preference or a requirement for attribute A(n) in the set of attributes, according to the set of available choices for the attribute A(n);
receiving and storing the input data for the attribute A(n) in machine-readable memory readable by the processor;
determining in the processor responsive to the input data and the specification a set of remaining items satisfying requirements for a subset of attributes A(i), for i equal to (n, n−1, . . . 1);
repeating the steps of supplying, generating, receiving and storing and determining for attributes A(n), for n equal to 1 to N; and
assigning and storing in machine-readable form, scores to items in the set of remaining items according to the input data indicating preferences for attributes and generating a results display presenting the items in the set of items to the user.

23. The method of claim 22, including ordering the items in the processor in the set of remaining items according to the scores and presenting in the results display the items in the set of items according to the ordering.

24. The method of claim 22, including organizing the attributes in a sequence according to the machine readable specification, and providing an indicator to the user of a position in the sequence during the step of generating a display.

25. The method of claim 22, wherein the preference data comprises a variable associated with a particular attribute specified by the user in the input data to have a degree of relevance to a choice in the product domain.

26. The method of claim 22, wherein the requirement data comprises a variable associated with a paicular attribute specified by the user in the input data to be required or not required for a choice in the product domain.

27. The method of claim 22, wherein the prompt display comprises a displaying graphical slider, including a range of choices represented by a bar displayed on a display, and a slide element displayed with the bar and positioned by a user with a input device on the bar to indicate a choice in the range.

28. The method of claim 22, wherein the machine readable specification organizes the attributes according to a hierarchical array, and assigns weights to corresponding attributes in the attributes in response to the gathered preference and requirement data and to positions in the hierarchical array of the corresponding attributes.

29. The method of claim 22, including prssing in the processor the input data to produce attribute measurements according to the input data.

30. The method of claim 29, wherein the attribute measurements for attributes have respective measurement types selected from a set of measurement types including
numeric for a numeric valuation of an attribute,
boolean for an attribute characterized by a true or false indicator,
enumerated for an attribute selected from a set or list,
option for an attribute that is included as standard feature, included as a optional feature, or not included, and
ranged numeric for an attribute specified by a range of numeric values; and including
computing in the processor item scores for respective items in the set of remaining items in response to the attribute measurements and normalization routines selected according to the measurement types.

31. The method of claim 29, including computing in the processor item scores for respective items in the set of remaining items in response to the attribute measurements.

32. The method of claim 22, wherein the marhine-readable specification includes rules assiged to attributes specifying a response to missing input data for the attribute, and including identifying in the processor an attribute for which the input data is missing, and applying the rule for the identified attribute.

33. The method of claim 22, wherein the step of assigning scores to items includes assigning rules in the machine-readable specification to attributes specifying a response to irrelevant input data for the attribute, identifying an attribute for which the input data is irrelevant, and applying the rule for the identified attribute.

34. The method of claim 22, wherein the display prompting for at least one attribute comprises a displaying graphical tool, including a range of choices represented by a graphic displayed on a display, and a selector element displayed with the graphic and positioned by a user with a input device on the graphic to indicate a choice in the range.

35. The method of claim 34, including computing a numeric value in response to the choice.

36. The method of claim 35, wherein the step of computing a numeric value includes applying a non-linear function to the position of the selector element on the graphic.

37. The method of claim 22, including organizing in the machine-readable specification the attributes in a sequence, and during the step of generating a prompt display, providing an indicator to the user of a position in the sequence, and a count of the items in the set of remaining items.

38. The method of claim 22, wherein the step of generating a prompt display includes producing data specifying one or more images for the display, and transmitting the data to a remote user on a network; and wherein the step of receiving and storing input data includes receiving the input data across the network from a remote user.

39. The method of claim 38, wherein the data specifying one or more images comprises an HTML document.

40. A method for generating a list of items from a product domain according to user preferences and requirements for attributes A(n), organized in a sequence for n equal to 1 to N, of items in the product domain, comprising:

supplying a specification in a machine-readable form to a processor, the specification defining a set of available choices for attribute A(n), where the set of available choices for attribute A(n) when n equals 1 includes the available choices for all items in the product domain, and includes the available choices for items in a set of remaining items when n is greater than 1;

generating in response to the specification a prompt display prompting a user to input data to the processor prompting a user to input one or both of preference data and requirement data for attribute A(n) according to the set of available choices for the attribute A(n), wherein the preference data comprises a variable associated with a particular attribute specified by the user to have a degree of relevance to a choice in the product domain, and the requirement data comprises a variable associated with a particular attribute specified by the user to be required or not required for a choice in the product domain;

receiving and storing the input preference data and requirement data for the attribute A(n) in machine-readable memory readable by the processor;

determining in response to the input preference and requirement data in the processor the set of remaining items satisfying requirements for a subset of attributes A(i), for i equal to (n, n−1, . . . 1);

providing an indicator on the prompt display of a position in the sequence, and a count of the items in the set of remaining items to the user;

repeating the steps of supplying, generating, receiving and storing, determining and providing for attributes A(n), for n equal to 1 to N, and assigning and storing in machine-readable form, scores to items in the set of remaining items according to the input data indicating preferences for attributes and ordering the items in the set of remaining items according to the scores; and producing a result display to present the set of remaining items to the user.

41. The method of claim 40, including organizing the set of attributes according to a hierarchical array in a machine-readable form, and assigning weights to corresponding attributes in response to the gathered preference and requirement data and to positions in the hierarchical array of the corresponding attributes.

42. The method of claim 40, including processing the input data to produce attribute measurements according to the input data, and computing the scores in response to the attribute measurements.

43. The method of claim 42, wherein the attribute measurements for attributes have respective measurement types selected from a set of measurement types including numeric for a numeric valuation of an attribute, boolean for an attribute characterized by a true or false indicator, enumerated for an attribute selected from a set, option for an attribute that is included as standard feature, included as a optional feature, or not included, and ranged numeric for an attribute specified by a range of numeric values; and wherein the step of computing the scores includes applying normalization routines using the processor selected according to the measurement types of the corresponding attributes.

44. The method of claim 40, wherein the step of assigning scores to items includes:

assigning missing data rules in the machine-readable specification to attributes specifying a response to missing input data for the attribute, identifying an attribute for which the input data is missing, and applying the missing data rule for the identified attribute; and assigning irrelevant data rules in the machine-readable specification to attributes specifying a response to irrelevant input data for the attribute, identifying an attribute for which the input data is irrelevant, and applying the irrelevant data rule for the identified attribute.

45. The method of claim 40, wherein the step of generating a prompt disappointing for at least one attribute comprises a displaying graphical tool, including a range of choices represented by a graphic displayed on a display, and a selector element displayed with the graphic and positioned by a user with a input device on the graphic to indicate a choice in the range.

46. The method of claim 45, including computing a numeric value in response to the choice.

47. The method of claim 46, wherein the step of computing a numeric value includes applying a fuzzy logic function to the position of the selector element on the graphic.

48. The method of claim 40, wherein the step of generating a prompt display includes producing data specifying one or more images for the display, and transmitting the data to a remote user on a network; and wherein the step of receiving and storing input data includes receiving the input data across the network from a remote user.

49. The method of claim 48, wherein the data specifying one or more images comprises an HTML document.

* * * * *